US007109677B1

(12) United States Patent
Gagnon et al.

(10) Patent No.: US 7,109,677 B1
(45) Date of Patent: Sep. 19, 2006

(54) MOTORIZED BARRIER OPERATOR SYSTEM FOR CONTROLLING A BARRIER AFTER AN OBSTRUCTION DETECTION AND RELATED METHODS

(75) Inventors: Richard E Gagnon, Pensacola, FL (US); James S Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 10/841,018

(22) Filed: May 7, 2004

(51) Int. Cl.
G05D 3/12 (2006.01)
E05F 15/00 (2006.01)

(52) U.S. Cl. .............. 318/466; 318/68; 318/468; 318/447; 318/484; 160/29; 49/26; 49/27; 49/28; 297/330; 297/331

(58) Field of Classification Search ........... 49/26–28; 160/29; 318/466, 68, 468, 447; 297/330, 297/331

See application file for complete search history.

(56) References Cited

U.S. PATENT DOCUMENTS

| | | | |
|---|---|---|---|
| 3,539,894 A | 11/1970 | Feldman | 318/463 |
| 4,338,553 A * | 7/1982 | Scott, Jr. | 318/266 |
| 4,383,206 A * | 5/1983 | Matsuoka et al. | 318/445 |
| 4,408,146 A | 10/1983 | Beckerman | 318/264 |
| 4,887,205 A * | 12/1989 | Chou | 700/90 |
| 5,191,268 A | 3/1993 | Duhame | 318/266 |
| 5,278,480 A | 1/1994 | Murray | 318/626 |
| 5,285,136 A | 2/1994 | Duhame | 318/266 |
| 5,351,439 A * | 10/1994 | Takeda et al. | 49/28 |
| 5,428,923 A | 7/1995 | Waggamon | 49/28 |
| 5,625,980 A | 5/1997 | Teich et al. | 49/26 |
| 5,841,253 A | 11/1998 | Fitzgibbon | 318/280 |
| 5,969,637 A | 10/1999 | Doppelt et al. | 340/825.69 |
| 5,982,124 A * | 11/1999 | Wang | 318/466 |
| 5,998,950 A | 12/1999 | Fitzgibbon et al. | 318/280 |
| 6,086,177 A * | 7/2000 | Driendl et al. | 318/466 |
| 6,118,243 A * | 9/2000 | Reed et al. | 318/468 |
| 6,239,569 B1 | 5/2001 | Fitzgibbon et al. | 318/480 |
| 6,246,196 B1 * | 6/2001 | Fitzgibbon et al. | 318/430 |
| 6,326,751 B1 | 12/2001 | Mullet et al. | 318/434 |
| 6,388,412 B1 * | 5/2002 | Reed et al. | 318/466 |
| 6,737,823 B1 * | 5/2004 | Reed et al. | 318/466 |
| 6,825,628 B1 * | 11/2004 | Heigl et al. | 318/468 |
| 6,859,004 B1 * | 2/2005 | Hormann | 318/469 |
| 6,873,127 B1 * | 3/2005 | Murray | 318/286 |
| 2003/0154656 A1 | 8/2003 | Fitzgibbon et al. | 49/26 |

FOREIGN PATENT DOCUMENTS

WO   WO 95/08858   9/1994

* cited by examiner

*Primary Examiner*—David Martin
*Assistant Examiner*—Elias Hiruy
(74) *Attorney, Agent, or Firm*—Renner Kenner Greive Bobak Taylor & Weber

(57) ABSTRACT

A method for controlling a motorized barrier operator after detecting an obstruction includes the steps of providing a motorized barrier operator that moves a barrier between limit positions and providing at least one control switch that upon actuation moves the barrier in a direction toward one of the limit positions. Actuation of the at least one control switch during movement of the barriers at least causes the barrier to stop. If an obstruction is detected by the motorized barrier operator during movement of the barrier, the operator allows only uni-directional movement of the barrier, regardless of actuation of the at least one control switch, after the detecting step.

34 Claims, 5 Drawing Sheets

MOTORIZED BARRIER OPERATOR SYSTEM FOR CONTROLLING A BARRIER AFTER AN OBSTRUCTION DETECTION AND RELATED METHODS

TECHNICAL FIELD

Generally, the present invention relates to a movable barrier operator system for use on a closure member moveable relative to a fixed member. More particularly, the present invention relates to an operator-controlled motor for controlling the operation of a closure member, such as a gate or door, between a closed position and an open position. More specifically, the present invention relates to a barrier operator, wherein the operator initiates predetermined operational procedures after detection of an obstruction event.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired or wireless wall station or other similar device. It is also known to provide safety devices that are connected to the operator for the purpose of detecting an obstruction so that the operator may then take corrective action with the motor to avoid entrapment of the obstruction.

How safety devices are used with a door operator system have evolved from the days of no uniform standard to the currently applied government regulations as embodied in Underwriters Laboratories Standard 325. UL Standard 325 encompasses safety standards for a variety of movable barriers such as gates, draperies, louvers, windows and doors. The standard specifically covers vehicular gate or door operators intended for use with garages and/or parking areas. Such devices require a primary safety system and a secondary safety system which are independent of each other. Primary entrapment systems sense the operator motor's current draw, or motor speed and take the appropriate corrective action if the monitored value is exceeded. Primary systems must be internal within the operator head. Secondary entrapment systems are typically external from the operator head and may include a non-contact or contact type sensor. But, secondary systems may also be internal to the operator head as long as they are independent of the primary system.

One of the more widely used non-contact safety devices is a photo-electric eye which projects a light beam across the door's travel path. If the light beam is interrupted during closure of the door, the operator stops and reverses the travel of the door. Contact type safety devices such as an edge-sensitive pressure switch, which is attached to the bottom edge of the door and runs the complete width of the door, may also be used. Other contact safety devices directly monitor the operating characteristics of the driving motor to determine whether an obstruction is present. Typically, shaft speed of the motor is monitored by projecting an infrared light through an interrupter wheel. Alternatively, Hall effect switches or tachometers can be used to monitor shaft speed. Or, the motor Current can be monitored such that when an excessive amount of current is drawn by the motor—which indicates that the motor is working harder than normal—it is presumed that an obstruction has been encountered. It is also known to monitor door speed with a sliding potentiometer, wherein a rate of change is equated to the speed of the door and wherein unexpected slowing of the door triggers corrective action by the operator. The secondary entrapment requirement may also be met by providing an operator that is capable of receiving continuous pressure on an actuating device that is in the line of sight of the door and maintains the opening or closing motion until the respective limit position is reached. Regardless of how the safety devices work, their purpose is to ensure that individuals, especially children, are not entrapped by a closing door. Opening forces of the door are also monitored to preclude damage to the operating system for instances where an object or individual is caught upon a door panel as the door moves upwardly.

Safety devices perform their function within the operator's direction control logic sequence where each operational signal sent to the motor controls initiates a different movement of the barrier. For example, if a barrier door is fully-closed, the next user command causes the door to open. If the barrier is fully open, the next user command causes the barrier to close. If the barrier is stopped, partially open, that is, between the fully-open and the fully-closed, then the barrier operator typically uses one of the following controlling logic sequences:

a) Four-Phase Logic: The barrier's next direction is opposite of its last direction. If the barrier's last direction was opening, then the next direction will be closing. If the barrier's last direction was closing, the barrier's next direction will be opening.

That is, each user command to the barrier operator steps the barrier's movement through four-phases: Open-Stop-Close-Stop-Open- . . . .

b) Open Only Logic: A stopped, partially open barrier can only be commanded to open. Only when the barrier is fully open, can a user command the barrier to close.

Although the operational logic remains the same, there are also motors that have separate directional windings where the first winding moves the door in the first direction and a second winding moves the door in the opposite direction. One exemplary device is shown in U.S. Pat. No. 5,841,253 to Fitzgibbon, et al. The '253 patent discloses a garage door opening and closing apparatus having improved operational safety features. The apparatus includes a control circuit which responds to a number of input stimuli to generate commands to open and close a garage door as well as to stop garage door movement. Three relays respond to the commands via drive circuitry to actually connect door operating voltages to the windings of a door controlling motor. By redundancies in the operation of the three relays, faults in the operation of those relays result in safe door operating conditions. Additionally, the control circuitry upon issuing a door stop command performs a test to determine whether or not the door is still moving. If the door is still moving, door up commands are generated by the control circuitry to place the door in a safe position.

In the prior art, garage door operators can create unanticipated hazards using "four phase logic" and can be less of a hazard but a nuisance using "open only logic." To give an example, if a user partially opens their garage door from the fully closed position to a height to allow venting of the garage or egress of a pet and the pet becomes lodged or wedged in the opening, then the user's first reaction may be to activate the door to open freeing the trapped animal. If the operator has "four phase logic," the next movement of the door would be in the closing direction increasing the force on the trapped animal. If the operator used "open only logic," the door would go up to its fully open position and the animal would be freed. However, stopped partially opened doors controlled by operators with "open only logic" will always go up when activated and must reach the upper travel limit before it can go down again. Therefore in the evening when the user wants to close the door, the door must travel to its upper limit, stop, and receive another signal to send it to the closed position.

Garage door operators should undergo a monthly obstruction reversal test where the door is closed on a 2" by 4" block of wood and the door must reverse when it hits the obstruction. If the door doesn't reverse, the user is required to reduce the down force by making an adjustment and continue to test and adjust until the door reverses. With an "open only logic," the door always returns to the full open position before another adjustment is made. Accordingly, making the adjustment for obstruction detection of operators with this type of control logic time is quite time consuming. This is normally considered to be an unacceptable nuisance. Further, if the number of door opening and closing cycles necessary to establish the force settings is excessive, the motor will heat up and the motor's thermal protector will open. This action shuts the motor down for a period of time preventing further settings until the motor cools down which also results in an unacceptable nuisance.

Normally, as the door is traveling in a downward direction and the door movement is blocked by an obstruction, the door will stop and reverse to the fully open position. During the reversal period, it is common to restrict further door movement commands for a period of time or distance to ensure the door will properly be removed off the object that caused the reversal. Indeed, typical residential garage door operators, upon detecting an obstruction of a downward moving door, stop the door's travel, pause for a short time (0.1 s to 1.0 s typical), and then the door begins upward travel to the full-open position. During this stop-pause-upward sequence, a user may command the door using a remote control or a wired control. A user door command during the stop-pause-upward sequence could stop the door completely, not allowing the sequence to complete. Such a device is disclosed in U.S. Pat. No. 6,239,569. And published patent application U.S. 2003/0154656 A1, discloses a system which inhibits user commands during the stop-pause-upward sequence.

Another system is described in U.S. Pat. No. 4,338,553 to Scott, Jr. which discloses a system that controls a motor which drives an operating mechanism for moving a barrier, such as an overhead garage door, in either direction between a closed position and an open position in response to actuation of a start switch. The control system includes an encoder including a rotatable disc driven by the motor, and control circuitry including an encoder pulse verification circuit associated with the encoder for detecting the direction of door movement as well as increments of travel by the door when the door is moved by the motor under control of a motor command circuit in response to actuation of the start switch. The start switch and a start circuit cooperate with the motor command circuit for energizing the motor to move the door in one direction, for de-energizing the motor to stop the door at any position, and for re-energizing the motor to reverse the door in response to repeated actuation of the start switch. An up/down counter circuit is responsive to the direction as well as the increments of travel by the door for containing a count representative of the actual position of the door. A programming circuit is included for setting an up limit set point which is stored in a latch circuit. A decoder circuit cooperates with the motor command circuit, the up/down counter circuit, the latch circuit, and a comparator circuit for de-energizing the motor when the door reaches the up limit set point as the door is opened. The decoder circuit cooperates with the motor command circuit and the up/down counter circuit for de-energizing the motor when the door reaches the threshold as the door is closed. An obstruction detector circuit is responsive to rate of movement of the door for sensing an obstruction. The obstruction detector circuit cooperates with the motor command circuit for de-energizing the motor if an obstruction is sensed as the door is opened and cooperates with the motor command circuit, the up/down counter circuit, and the decoder circuit for reversing the motor if an obstruction is sensed as the door is closed unless the door is a predetermined distance or less above the threshold whereupon reversal of the motor is inhibited and the motor is merely de-energized. A reset circuit is included for resetting the control circuitry so that the initial actuation of the start switch will cause the door to be opened. This type of system uses the basic close/stop/open/stop sequence logic for motor response to push button input, either from a hardwired switch or radio frequency remote.

U.S. Pat. No. 5,191,268 to Duhame discloses an automatic door operator with a continuously monitored supplemental obstruction detector. In a first embodiment, the obstruction detector is a radiant beam obstruction detector that transmits a beam of modulated radiant energy across the door opening. A safety signal generator produces an active safety signal only on unobstructed receipt of radiant energy by a receiver. Failure to receive the active safety signal when the motor is closing the door at least stops the door. A two-wire cable, which carries both power and the active safety signal, connects the supplemental obstruction detector to the automatic door operator. Constant activation of a portable transmitter or of a local push button can override the supplemental obstruction detector to close the door. An alternative supplemental obstruction detector includes a safety edge having a compressible tube disposed on a leading end of the door. Plural conductors change their conductive state upon compression of the compressible tube. This embodiment may include a delay upon detection of compression of the compressible tube so that contact with the floor is not detected as an obstruction. This type of controller includes a provision to override the obstruction signal to close the door. Constant activation of the portable transmitter or constant depression of the local push button overrides the obstruction detector. In an alternative embodiment, only constant depression of the local push button will override the obstruction detector permitting closure of the door.

U.S. Pat. No. 5,278,480 to Murray discloses a garage door operator with a microcomputer based control which is programmed to measure door position from full open position by counting motor revolutions and to determine motor speed and deceleration for each revolution. The program learns the open and closed position limits as well as force sensitivity limits for up and down operation with minimal user input. During normal door operation the closed limit and the sensitivity limits are adaptively adjusted to accommodate changes in conditions. The lowest up and down motor speeds in each operation are stored for comparison with motor speeds in the next like operation for obstruction detection. Motor deceleration is also monitored for obstruction detection. For more sensitive obstruction detection during closing, the motor speed is mapped for each revolution for the last several inches of closing. The map is stored after each successful closing operation and the corresponding speeds in the next closing are compared point-by point with the mapped speeds to detect slow down due to touching an obstruction. To make the door operator more responsive to an obstruction during its lower range in closing direction than is possible by the single value closing sensitivity limit, the motor speed is mapped at each motor revolution during each closing over the final several inches of travel, say, from 12 inches above the closed position limit to the obstruction reference, and the mapped values are stored in the controller. Then, during the next closing operation each newly measured motor speed is compared to the stored speed at the corresponding door position. If the motor speed is below the stored value by a predetermined offset, an obstruction is detected and the door will be caused to stop and then reopen. Whenever the door closes without detection of an obstruction, the most recent set of mapped speeds is substituted for the previous one. Although this method causes the door to "stop and then reopen" there is no provision to allow the door to stop in response to the next command and continue to open on the subsequent command.

U.S. Pat. No. 5,285,136 to Duhame discloses an automatic door operator with a continuously monitored supplemental obstruction detector much like the one disclosed in Duhame's '268 patent. This disclosure is distinguishable in that it includes an oscillator sealed within the tube at one end which supplies the safety signal. This embodiment may include a delay upon detection of compression of the compressible tube so that contact with the floor is not detected as an obstruction.

U.S. Pat. No. 5,428,923 to Waggamon discloses that a light beam utilized in an obstruction detector is coded into packets of pulses by a transmitter according to a code generated only by the transmitter. When the light beam is received, the receiver recovers the code signal and supplies it to a code detection circuit. In one preferred embodiment, to detect the code, the code detection circuit supplies the code signal and a delayed version of the code signal to an "exclusive or" gate. In another embodiment, a frequency detection circuit determines whether the code signal detected by the receiver is within a predetermined permissible range. If the code is not present, the door operator system reverses the door if it is closing, and prevents the door from closing if it already is in the up position, or if it is opening. The door operator system will operate in this way not only in response to obstructions, but also, in response to errors and malfunctions in the wiring to the transmitter and receiver, and in the transmitter and receiver themselves.

In summary, the prior art either accepts and handles the user's barrier command as a normal command to start or stop the barrier; uses the command sequence to open/stop/close/stop the barrier; or, in the event of an obstruction detection, the user commands are locked out for a period of time while the door stops, reverses, stops or returns to its fully open position. As noted, some prior art prevents the user from entering a door command for a period of time after an obstruction event or until the barrier has traveled a predetermined distance. In either case, the user, who may be in an excited condition at the occurrence of an entrapment, may repeatedly actuate the control buttons which may result in the barrier moving downwardly and causing further injury. Therefore, there is a need in the art for corrective action to be taken by the operator upon detection of an obstruction, but wherein the correction action still allows the user to have at least limited control of barrier movement.

DISCLOSURE OF INVENTION

It is thus an object of the present invention to provide a motorized barrier operator system for controlling a barrier after an obstruction detection and related methods.

In general, the present invention contemplates a method for controlling a motorized barrier operator after detecting an obstruction, the method comprising providing a motorized barrier operator that moves a barrier between set limit positions; providing at least one control switch that upon actuation moves the barrier in a direction toward one of the set limit positions, wherein actuation of the at least one control switch during movement of the barrier causes the barrier to at least momentarily stop; detecting an obstruction by the motorized barrier operator; and allowing only unidirectional movement of the barrier, regardless of actuation of the at least one control switch, after the detecting step.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
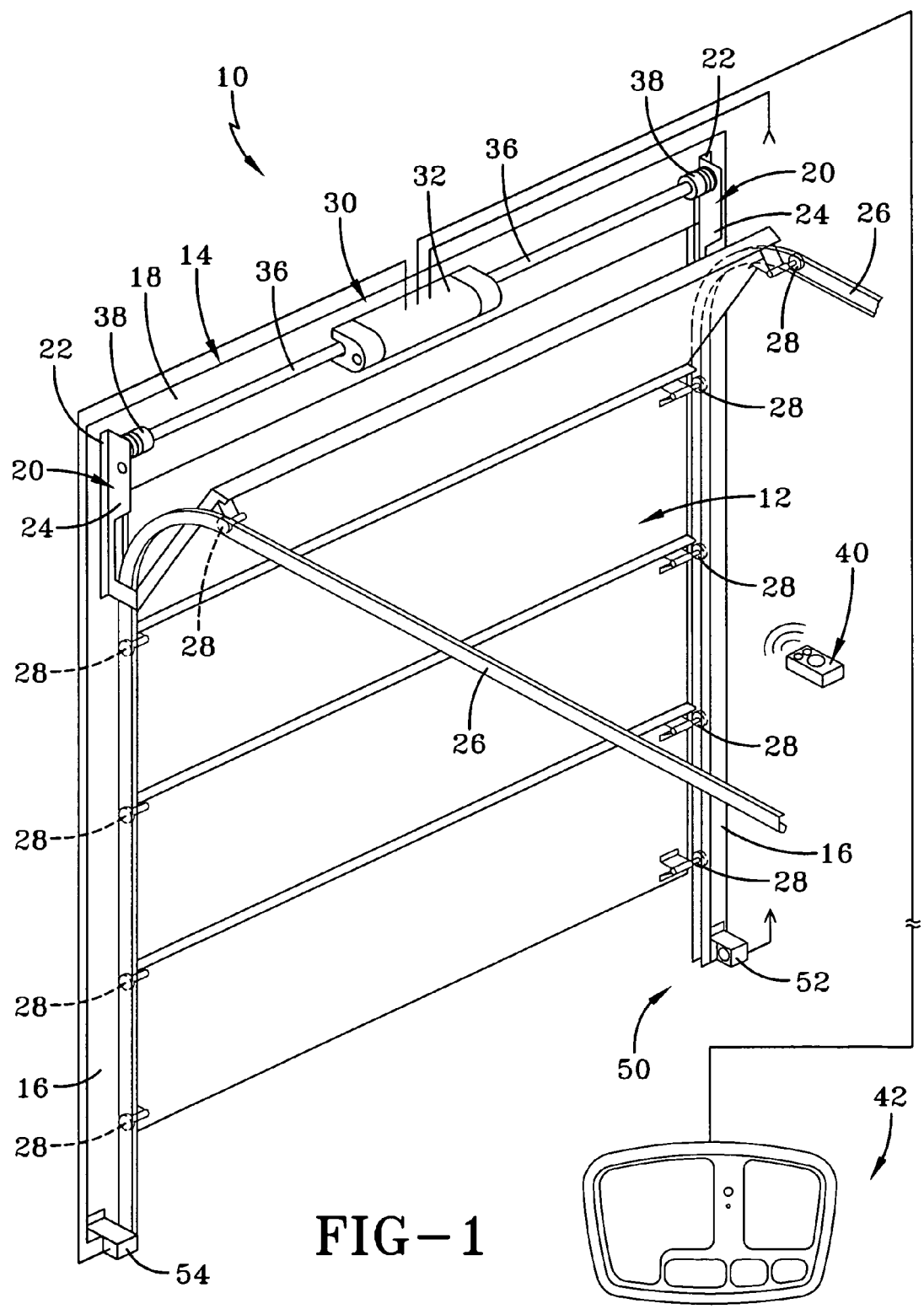
FIG. 1 is a fragmentary perspective view depicting a sectional garage door and showing an operating mechanism embodying the concepts of the present invention.

A motorized barrier operator adaptable to different safety configurations is generally indicated by the numeral 10 in FIG. 1 of the drawings. The system 10 is employed in conjunction with a conventional sectional garage barrier or door generally indicated by the numeral 12. The teachings of the present invention are equally applicable to other types of movable barriers such as single panel doors, gates, windows, retractable overhangs, and any device that at least partially encloses an area. The door 12 is most likely an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground (not shown). The jambs 16 are spaced and joined at their vertically upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
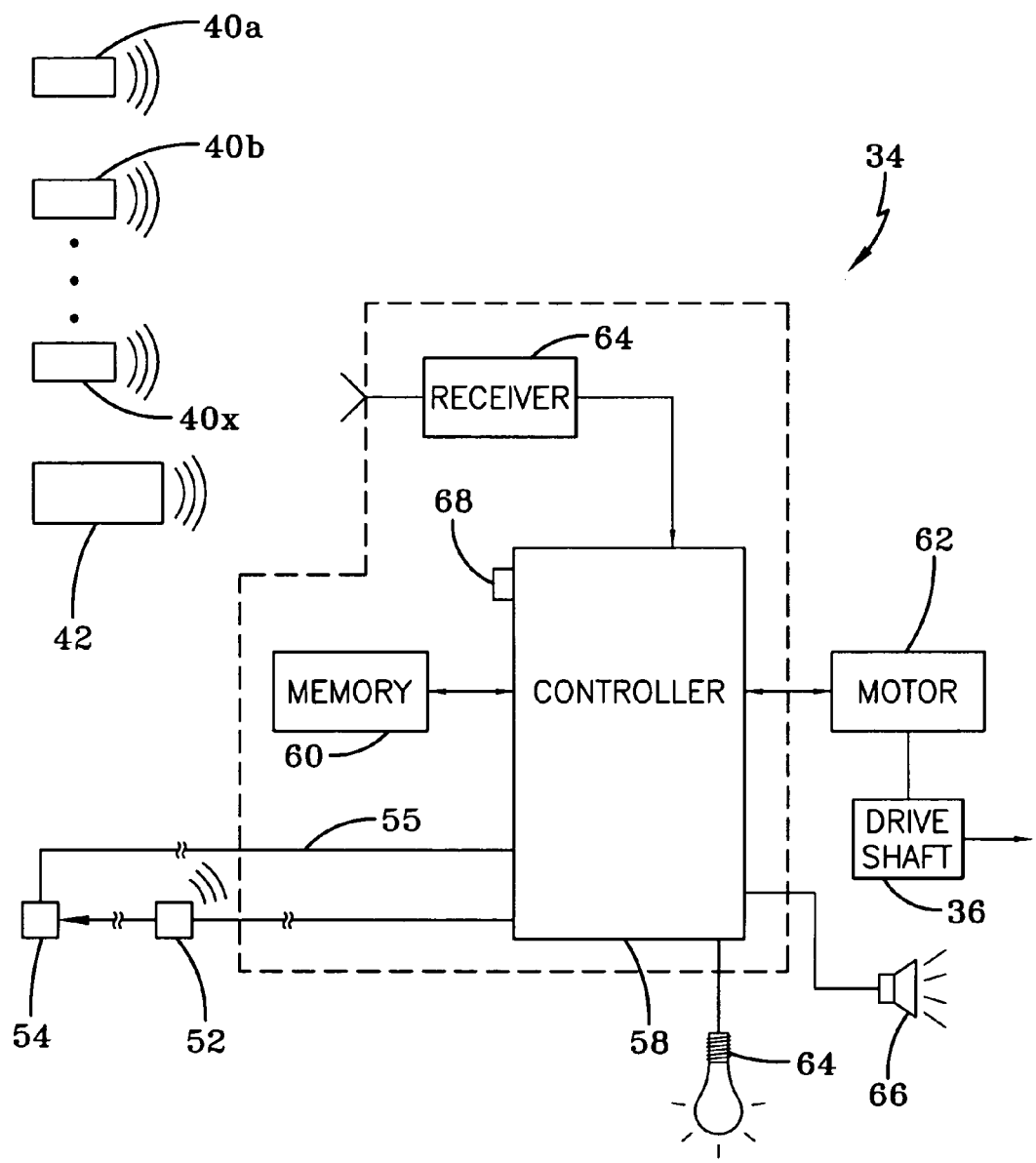
FIG. 2 is a schematic diagram of an operator mechanism.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism generally indicated by the numeral 34 as seen in FIG. 2. Extending from each end of the operator mechanism 34 is a drive shaft 36, the opposite ends of which are received by tensioning assemblies 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with movable barriers. This includes, but is not limited to, trolley, jackshaft, screw-type or other header-mounted operators.

In order to move the door from an open position to a closed position or vice versa, a remote transmitter 40, a wall station transmitter 42 or a keyless entry pad may be actuated. The remote transmitter 40 may use infrared, acoustic or radio frequency signals that are received by the operator mechanism to initiate movement of the door. Door movement may be initiated by the user or may be done in a "hands free" manner by the relative position of the transmitter with respect to the operator. Likewise, the wall station 42 may perform the same functions as the remote transmitter 40 and also provide additional functions such as the illumination of lights and provide other programming functions to control the manner in which the barrier is controlled. The wall station 42 may either be connected directly to the operator mechanism 34 by a wire or it may employ radio frequency or infrared signals to communicate with the operator mechanism 34. The wall station is preferably positioned within the line of sight of the barrier as it moves between positions.

An external secondary entrapment system, which is designated generally by the numeral 50, may be included with the system 10. In the preferred embodiment, the entrapment system 50 is a photoelectric sensor which has a sending device 52 and a receiving device 54. The sending device 52 is mounted to either the jamb 16 or the track 26 near the floor of the door area. The devices 52 and 54 are mounted at about 5 inches above the floor and on the inside of the door opening to minimize any interference by the sun. It will be appreciated that the position of the devices 52 and 54 may be positionably reversed if needed. In any event, the sending device 52 emits a visible, laser or infrared light beam that is detected by the receiver 54 which is connected to the operator mechanism 34. If an object interrupts the light beam during door travel, the receiver relays this information via an obstruction signal 55 to a controller maintained in the operator mechanism which initiates the appropriate corrective action. In this way, if an object interrupts a light beam during a downward motion of the garage door, the motion of the door is at least stopped and/or returned to the opening position. It will be appreciated that other external secondary entrapment features or systems such as a contact-type safety edge on the bottom panel of the door could be used to generate obstruction signals.

Referring now to FIG. 2, it can be seen that the operator mechanism 34 employs a controller 58 which receives power from batteries or some other appropriate power supply. The controller 58 includes the necessary hardware, software, and a memory device 60 to implement operation of the operator 34. It will be appreciated that the memory device 60 may be integrally maintained within the controller 58. When either the remote transmitter 40 or wall station 42 is actuated, a receiver 64 receives the signal and converts it into a command signal useable by the controller 58. If a valid command signal is received by the controller 58, it initiates movement of the motor 62 which, in turn, generates rotatable movement of the drive shaft 36 and the door or barrier is driven in the appropriate direction. The external secondary entrapment system 50, particularly the sending and receiving units 52, 54, are directly connected to the controller 58 to provide appropriate input. The entrapment system may be directly wired to the controller 58. In the alternative, a wireless transceiver could be associated with the receiving and sending units 52/54 for the purpose of communicating with the controller 58 without wires.

Other features of the system 10 may include a light 64 and an audio speaker 66. The light 64 may be toggled on and off by actuation of an appropriate button on the wall station 42 or upon initiation of barrier movement. And the light 64 or the speaker 66 may be used to indicate various programming modes of the controller. Such modes may be entered by pressing, or pressing and releasing a program button 68 that is operatively connected to the controller 58. Entering of a programming mode with the button 68 allows for the controller to enable and/or disable various safety features associated with the system 10. Or the programming mode may be entered by selective actuation of buttons on the wall station 42 or by other known means. The programming mode may be used to set the fully-open and fully-close travel limits. In the context of a garage door, the fully-close limit position is when the door is contacting the floor and the fully-open limit position is when the door in no way blocks ingress or egress from the opening defined by the frame 14. The fully-open and fully-close limit positions are distinguishable from the extreme door travel limit positions which are determined by the barrier and its' supporting structure. In most instances, the fully-close limit position and the extreme-close limit is determined by the floor location and are one in the same. The fully-open limit position is preferably somewhat removed from the extreme-open limit position so as to prevent mechanical stress and fatigue on the barrier and its' supporting structure. The fully-open and fully-close limit positions are preferably set in the programming mode, but they may be set by the user by implementing options available in other set-up routines. The components of the operator mechanism and remote wireless components may be powered by a conventional residential power source and/or by batteries.

Figure 3:
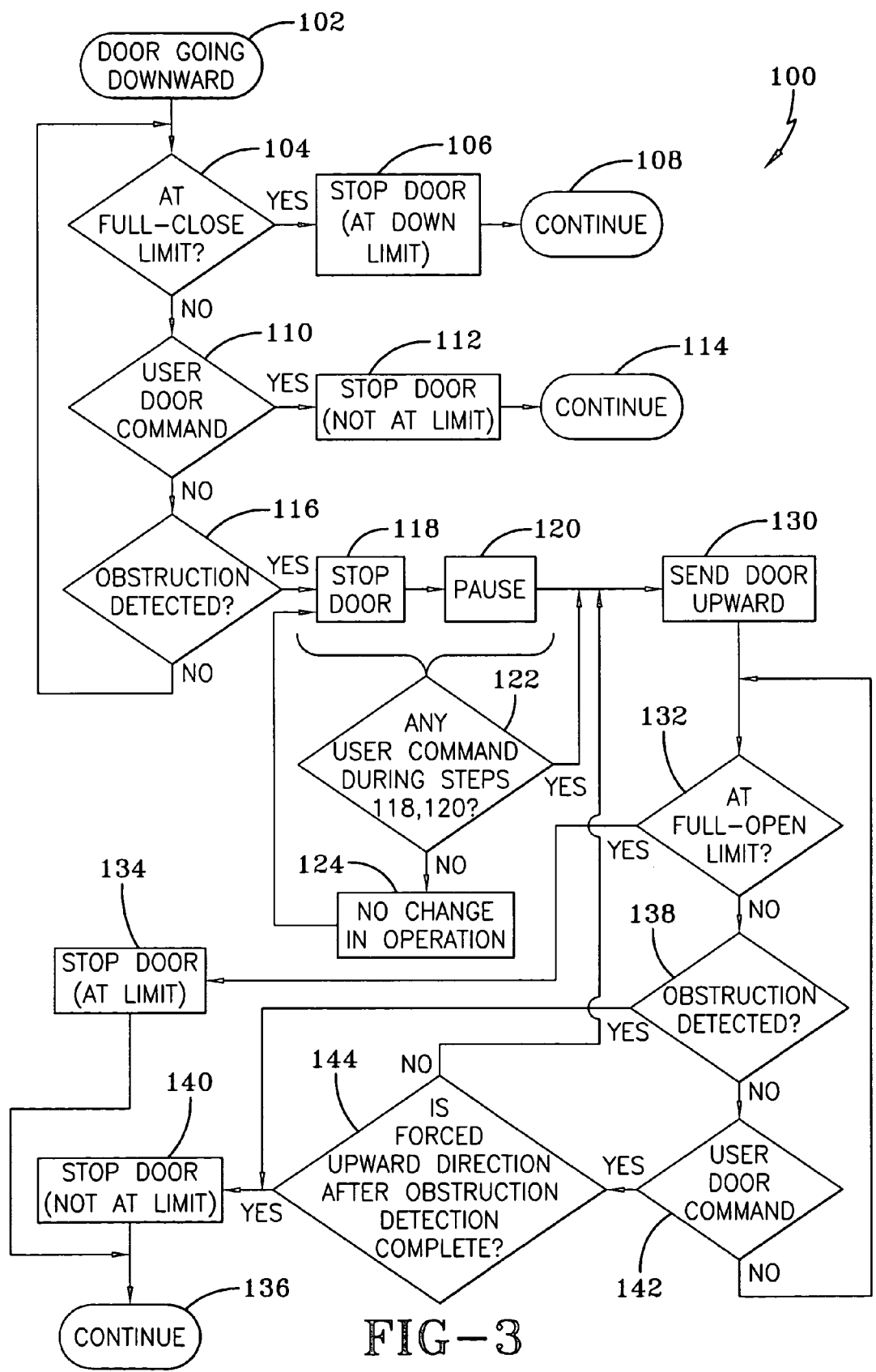
FIG. 3 is an operational flow chart employed by operator of the present invention for controlling a barrier after obstruction detection.
Figure 4:
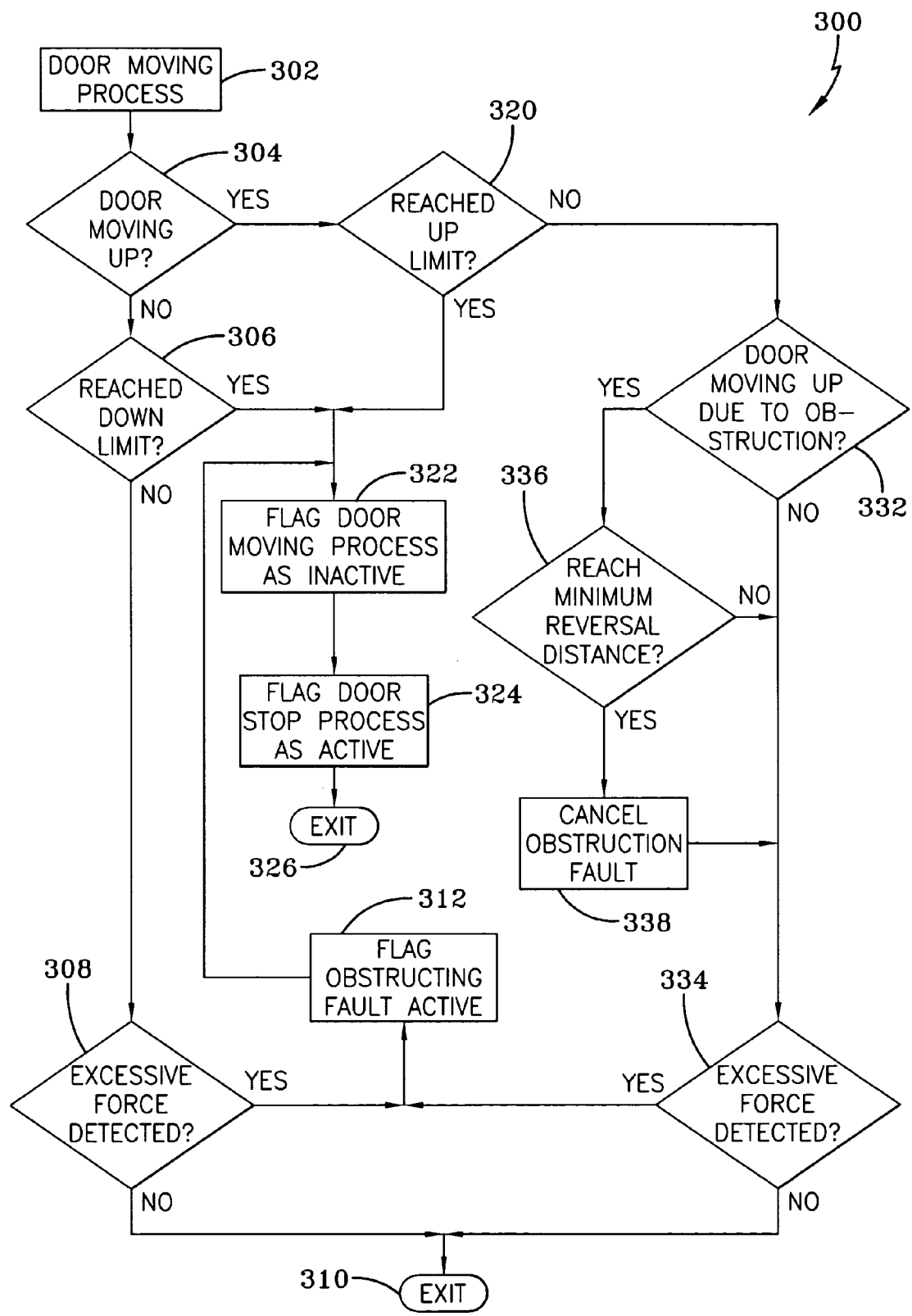
FIG. 4 is an operational flow chart utilized by the operator of the present invention for an alternative embodiment for controlling a barrier after obstruction detection in a door moving process.
Figure 5:
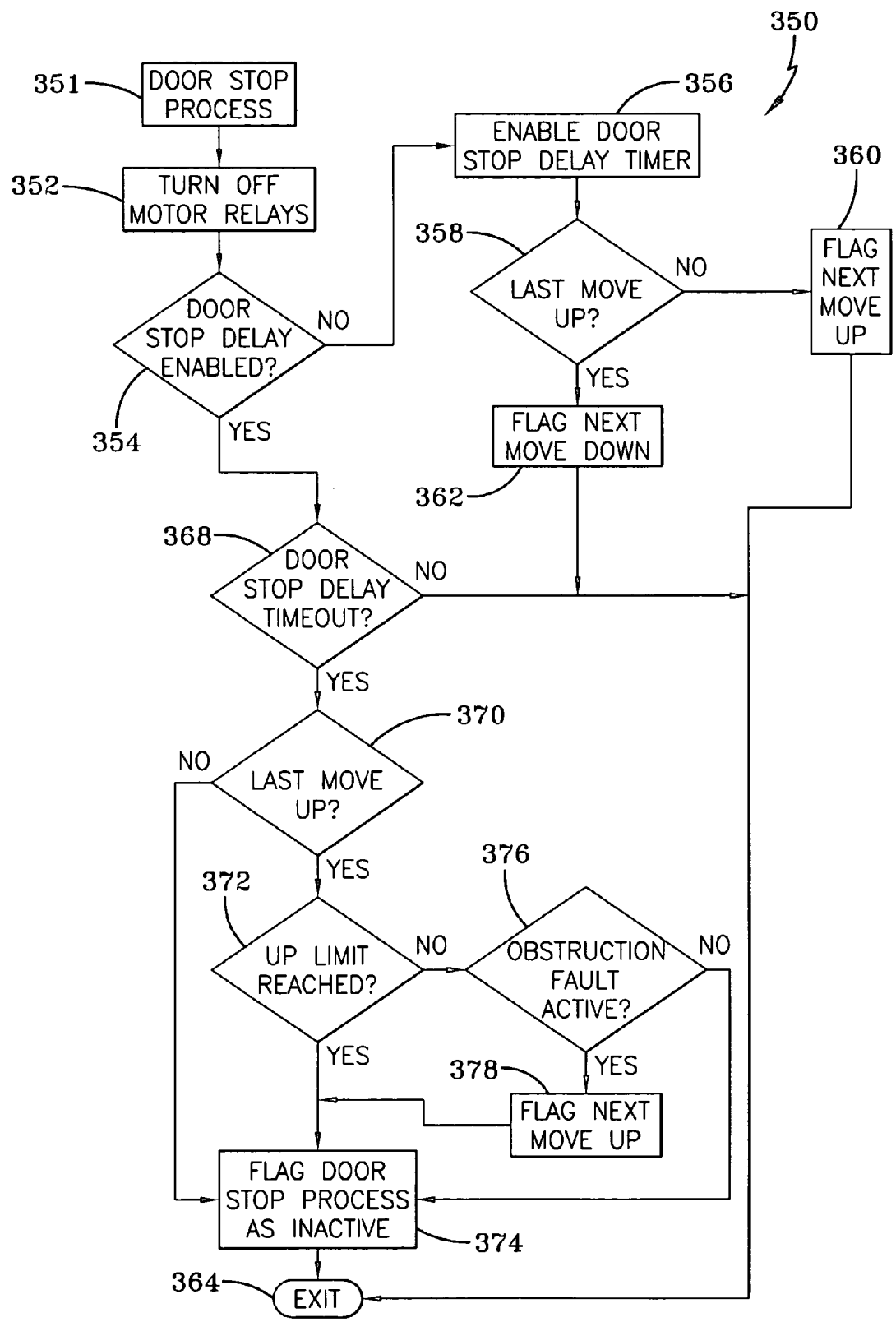
FIG. 5 is an operational flow chart of the alternative embodiment.

Referring now to FIGS. 3, 4 and 5, it can be seen that operational flow charts are respectively designated by the numerals 100, 300, and 350 for controlling a barrier after an obstruction detection event. The operational procedures disclosed accomplish the same goal of controlling a barrier so as to enhance the safety operation thereof. Briefly, both methodologies move the door in an upward direction after an obstruction is encountered in the path of the door. The methodologies do not allow for the end-user to move the door in a closing direction or, in the alternative, ensures that the travel of the door is stopped if a door closing command is received. Indeed, movement of the barrier will only continue when one of three conditions are met: when the door reaches a preset upper travel limit; when a predetermined period of time elapses; or when the door travels a predetermined distance. Implementation of these methodologies do not defeat the internal and external obstruction detection devices and it will further be appreciated that these methodologies may be implemented into the controller's operating program without the need for additional hardware components.

In the embodiment shown in FIG. 3, the methodology ensures that the door will not stop, but will travel upward, upon detection upon of an obstruction. As such, if a panicked end-user repeatedly hits the up/down actuation switch or button, the door will only move in an up direction and not in a down direction. This will eliminate the possibility of the panicked end-user from unintentionally causing the door to close upon the entrapped object or obstruction.

Specifically referring now to FIG. 3, it can be seen that a methodology is disclosed generally by the numeral 100. At step 102, the methodology is implemented when the barrier is moving in a downward or closing direction. At step 104, the operator controller determines if the barrier has reached the full-close limit position. If this is the case, then at step 106 the operator stops the door—at the limit position—and the operator continues on at step 108 in the normal operational manner.

If, however, at step 104, it is determined that the barrier is not at the full-close limit, then the process proceeds to step 110 to determine whether a user door command has been received from any one of the transmitters. If a door actuation command is detected at step 110 then the door is stopped at step 112. This is typically done to vent the garage or allow ingress and egress of pets. Next, at step 114 the operator controller's methodology continues on with the normal operational procedures and awaits the next user command.

If, however, at step 110 it is determined that a user door command has not been entered then at step 116 the controller determines whether an obstruction has been detected by one of the operator's safety devices. If no obstruction is detected then the process returns to step 104 and steps 104, 110 and 116 are repeated as discussed above.

If, however, at step 116 an obstruction is detected then the door is stopped at step 118 and paused at step 120 for a predetermined period of time. At step 122 the operator controller monitors for any door actuation commands during execution of steps 118 and 120. If no user command is detected then at step 124 there is no change in operation and the methodology returns to step 118 until such time that the pause step is completed.

If, however, at step 122 it is determined that a user command has been entered at any time during steps 118 and 120, or upon completion of the pause the process proceeds to step 130 and the barrier is automatically directed toward the open position. Upon sending the door upward at step 130, the controller determines whether the barrier has reached a full-open limit at step 132. If the full-open limit has been reached, then at step 134 the door is stopped and the controller continues on at step 136 with normal operation.

If, however, at step 132 it is determined that the barrier has not reached a full-open limit and the obstruction is still detected at step 138, then at step 140 the barrier is automatically stopped at a position other than one of the set limits and the process continues on at step 136 as previously discussed. If, however, at step 138 an obstruction is not detected the process continues on to step 142 to determine whether a user door command has been entered. If not, the process returns to step 132 to determine if a full-open limit has been reached by the barrier and those associated steps. If, however, an obstruction has not been detected and a user door command is detected, then at step 144 the operator controller determines whether the barrier has been forced in an upward direction after obstruction detection has been completed. In other words, the controller inquires as to whether a predetermined period of time has elapsed since the barrier has been moving in an upward or opening direction, or whether the barrier has moved at least a predetermined distance in the upward or opening direction. If the initial upward motion has not been completed, then the process returns to step 130 and the door is sent upward.

If, however, at step 144 it is determined that the forced upward direction after an obstruction detection is complete, then the door is stopped at step 140 and the process continues on at step 136.

This embodiment is advantageous over the prior art inasmuch as it ensures that the door will always travel upward after an obstruction detection until occurrence of a predetermined event and regardless of door command signals. This embodiment allows the user to have control of the door after an obstruction is detected, but will not allow the door to move in a closing direction until the door reaches the full-open limit, or until a predetermined period of time elapses, or until the door travels a predetermined distance. In summary, upon detecting an obstruction in the path of a downwardly moving barrier or door, the controller stops the door's travel and pauses for a short predetermined period of time, typically one-tenth of a second to one-second as indicated at steps 118 and 120. Following this the door begins upward travel to the full-open position. During the stop-pause upward sequence, a user may command the door using a remote controller or a wired control or wall station. Any user door command during the stop-pause upward sequence will only cause the door to go upward, even if the door is already traveling upward. Accordingly, any door movement command after detection of an obstruction is considered an upward door command. This mode is in effect after the stop-pause upward sequence for a predetermined period of time or until the door has traveled a predetermined distance.

Referring now to FIGS. 4 and 5, it can be seen that an alternative methodology is designated generally by the numerals 300 and 350. Briefly, it will be appreciated that this methodology utilizes a "three-phase logic" after an obstruction is sensed where the barrier can be stopped on the upward movement like the "four-phase logic." However, the next command signal received by the operator sends the barrier up again such that the sequence is now up-stop-up-stop response for each subsequent signal until the barrier reaches the full-open position. In other words, the operator controller automatically switches from four-phase logic to three-phase logic when an obstruction is encountered. And this embodiment never blocks out user controls. As such, the operator controller remains in the three-phase logic mode, after an obstruction is sensed, for a predetermined distance of barrier travel or a predetermined period of time. As in the previous embodiment, this allows the user to always have control of the barrier and gives the user the benefits of a four-phase logic system and an open-only logic system when needed with the ability to stop the barrier during the upward door travel. In implementing this methodology it will be appreciated that a certain number of flags or pre-designated states are utilized to assist in the process. These flags or states are maintained by the operator's memory. In particular, a "Last Move" status is designated as either up or down and initially this flag is designated in the down state. A "Next Move" flag is initially set in an up condition and is changed to a down condition as appropriate. There is also a "Door Moving" and a "Door Stop" condition either of which may be in an active or inactive state. And there is a Door Stop Delay function that is essentially a system timer. There is an Obstruction Fault flag that may either be set in an active or inactive condition. The benefit of setting these particular flags will become apparent as the methodology is described. The software employed by the controller utilizes a task manager that calls certain sub-routines or processes as needed. In the present embodiment, two events that trigger the methodology 300 are a door moving process, designated as step 302 in FIG. 4, and a door stop process, designated as step 351 in FIG. 5. When such an event is detected, the appropriate process is executed.

The door moving process 302, initiates step 304, where the operator determines whether the door is moving upward or in an opening direction. If the door is not moving upwardly—presumably moving downwardly or closing—the process continues to step 306 to determine whether the full-close limit has been reached. If the full-close limit has not been reached, then the operator controller monitors the motor and safety sensors to determine whether an excessive force has been detected or not at step 308. If no excessive force is detected at step 308, then the process continues to step 310 and this particular sub-routine of the operational system is exited.

If at step 308 an excessive force is detected then the process proceeds to step 312 wherein the operator controller sets the Obstruction Flag to an "active" condition.

If at step 304 the operator controller confirms that the door is in fact moving in an up or open direction then the process continues to step 320 to determine whether the full-open limit has been reached. If so, the process continues to step 322 whereupon a Door Moving Process flag is set as inactive and the Door Stop Process flag is set as active at steps 322, 324, respectively. At this time, this door moving process subroutine is exited at step 326.

Returning to step 320, if the barrier has not reached the full-open limit, then the operator controller checks the Obstruction Fault flag to determine whether it is active or inactive. If at step 332 it is determined that the barrier is not moving up due to an obstruction—the Obstruction Fault flag is inactive—then at step 334 the operator controller determines whether an excessive force is detected or not. If an excessive force, which in this instance is likely to be motor force, is not detected, then the process continues to step 310 and the subroutine is exited. If, however, at step 334 it is determined that an excessive force is detected, then at step 312 the Obstruction Fault flag is set to active and the process proceeds with steps 322–326. These steps are also implemental if an excessive force is detected at step 308.

If, however, at step 332 it is determined that the door is moving up due to an obstruction—the Obstruction Fault flag is active—then at step 336 the operator controller determines whether a minimum reversal distance has been reached or not. This minimum distance is preferably about 6 inches, although other distances could be specified. If the minimal reversal distance has not been reached, then the process proceeds to step 334 and branches between either step 310 or steps 312–326 as previously described. If however at step 336 it is determined that the minimum reversal distance has been traveled then at step 338 the Obstruction Fault flag is changed from active to inactive at step 338. Then at step 334 the process determines whether an excessive force is being detected or not as previously described.

Once the door or barrier is placed in a stop condition, the operator controller implements the Door Stop process 350 shown in FIG. 5. At step 351 the appropriate motor relays, which control operation of the motor are turned off. At step 354 a determination is made as to whether the Door Stop Delay timer has been enabled or not. If the Door Stop Delay has not been enabled, then at step 356 the Door Stop delay timer is initiated. The operator controller then queries the Last Move flag indicator at step 358 and if the last move was not in an upward direction, then at step 360 the Next Move flag is designated as up. However, if it is determined that the last move was in fact up at step 358, then the Next Move flag is designated as down at step 362. Following setting of the Next Move flag at steps 360 or 362 the process continues to step 364 and this particular subroutine is exited.

Returning to step 354, if the Door Stop Delay has been enabled then the process continues to step 368 to determine whether the timer, started at step 356, has expired or not. If the timer has not expired, then the process continues to step 364 and the subroutine is exited. If the Door Stop Delay timer has expired at step 368, then the process proceeds to step 370 and the controller queries the Last Move flag. If the last move of the barrier was upwardly, then at step 372 the controller queries as to whether the full-open limit has been reached. If so, then at step 374 the Door Stop Process flag is changed to inactive and the process exits at step 364.

If at step 372 it is determined that the full-open limit has not been reached then the process continues to step 376 and the Obstruction Fault flag is queried. If the Obstruction Fault Flag is in an inactive state then the process continues to step 374 and the Door Stop Process flag is changed to inactive and the subroutine is exited. However, if the Obstruction Fault flag is determined to be active at step 376, then the controller proceeds to step 378 and the Next Move Flag is changed to up. Upon completion of this step, step 374 is executed and the Door Stop Process flag is set to inactive.

The advantages of this particular embodiment are readily apparent. In this embodiment, during the closing of a barrier and when an obstruction is encountered, the obstruction detection devices cause the barrier to stop and reverse the barrier, and the operator controls switch to three-phase logic. While the barrier is traveling upward, after reversal, the user can stop the movement of the barrier at any time. Accordingly, this embodiment is distinguishable from the previous embodiment in that the door may be at least stopped during the corrective action sequence after detection of an obstruction. Once the predetermined distance away from the obstruction is reached or the predetermined period of time has expired, the operator controls for the barrier will switch back to four-phase logic which is the sequence of up/stop/down/stop/up/stop/down.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for controlling a motorized barrier operator after detecting an obstruction, the method comprising:
   providing a motorized barrier operator that moves a barrier between limit positions upon actuation of at least one control switch;
   receiving a valid command signal which moves said barrier in a direction toward one of said limit positions, wherein receipt of said valid command signal during movement of said barrier causes said barrier to at least momentarily stop;
   determining a movement direction of said barrier and whether one of said limit positions is reached;
   detecting an excessive force by said motorized barrier operator; and
   setting a door moving process flag as inactive and a door stop process flag as active if either limit position is reached or the excessive force is detected, and setting an obstruction fault flag as active if the excessive force is detected;
   initiating a door stopping process if said door stop process flag is active;
   enabling a door stop delay timer;
   checking a last move flag to determine if said barrier is moving in an opening direction; and
   setting a next move flag to down if said barrier is moving in an opening direction and setting said next move flag to up if said barrier is moving in a closing direction so as to allow only uni-directional movement of said barrier, regardless of actuation of said at least one control switch, after said detecting step, and during running of said door stop delay timer.

2. The method according to claim 1, further comprising: allowing at least stoppage of said barrier only after said barrier reaches one of said limits.

3. The method according to claim 2, further comprising: allowing stoppage and bi-directional movement of said barrier once said barrier reaches one of said limits.

4. The method according to claim 1, further comprising: allowing at least stoppage of said barrier only after a predetermined period of time elapses.

5. The method according to claim 4, further comprising: allowing at least stoppage and bi-directional movement of said barrier only after said predetermined period of time elapses.

6. The method according to claim 1, further comprising: allowing at least stoppage of said barrier only after said barrier travels a predetermined distance.

7. The method according to claim 6, further comprising: allowing stoppage and bi-directional movement of said barrier only after said barrier travels said predetermined distance.

8. The method according to claim 1, further comprising: stopping said barrier after detecting an obstruction for a predetermined period of time;
   monitoring for actuation of said at least one control switch; and
   moving said barrier upward upon one of said elapsing of said predetermined period of time and actuation of said at least one control switch.

9. The method according to claim 8, further comprising: determining whether said barrier is at a full-open limit position and stopping said barrier if at said full-open limit position; and
   monitoring for obstruction detection as said barrier moves toward said full-open limit position and, if said obstruction is detected, stopping said barrier.

10. The method according to claim 9, further comprising: monitoring for actuation of said at least one control switch as said barrier moves toward said full-open limit position and if actuation is not detected repeating said determining step.

11. The method according to claim 9, further comprising: monitoring for actuation of said at least one control switch as said barrier moves toward said full-open limit position and if actuation of said at least one control switch is detected, said motorized barrier operator determines whether said barrier has completed initial upward barrier movement.

12. The method according to claim 11, further comprising:
   stopping movement of said barrier if said barrier has completed initial upward barrier movement resulting from the initial obstruction detection.

13. The method according to claim 11, further comprising:
   continuing upward movement of said barrier, if said barrier has not completed initial upward barrier movement resulting from the initial obstruction detection and actuation of said at least one control switch during said initial upward barrier movement has not occurred.

14. The method according to claim 1, further comprising: re-setting said obstruction fault flag as inactive if said barrier moves a predetermined distance.

15. The method according to claim 14, further comprising:
   re-setting said door stop process as inactive if said door stop delay timer has elapsed, said last move flag is in an up condition, and a full-open limit position is reached.

16. The method according to claim 14, further comprising:
   re-setting said door stop process as inactive and a next move flag to up, if said door stop delay timer has elapsed, a full-open limit position has not been reached and the obstruction fault flag is active.

17. The method according to claim 14, further comprising:
   re-setting said door stop process as inactive, if said door stop delay timer has elapsed, a full-open limit position has not been reached and the obstruction fault flag is inactive.

18. A motorized barrier operator system to move a barrier, comprising:
   a motor for moving the barrier between limit positions;
   an operator for controlling operation of said motor;
   at least one transmitter that transmits command signals to the operator to initiate movement of the barrier;
   a safety device which detects obstructions in the barrier's path between the limit positions and generates an obstruction signal, wherein said operator determines a movement direction and whether one of said limit positions has been reached, and said operator sets a door moving process flag as inactive and a door stop process flag as active if either limit position is reached or said obstruction signal is detected, and sets an obstruction fault flag as active if said obstruction signal is detected; and
   a door stop delay timer controlled by said operator, wherein said operator initiates a door stop process if said door stop process flag is active and enables said door stop delay timer, and wherein said operator checks a last move flag to determine if the barrier is moving and wherein said operator sets a next move flag to down if the barrier is moving in an opening direction and said operator sets said next move flag to up if the barrier is moving in a closing direction, said operator allowing only uni-directional movement of the barrier, regardless of receipt of said command signals, after receiving said obstruction signal and while said obstruction fault flag is active.

19. The system according to claim 18, wherein said operator at least allows stoppage of the barrier only after the barrier reaches one of the limit positions.

20. The system according to claim 19, wherein said operator allows stoppage and bi-directional movement of the barrier once the barrier reaches one of the limits.

21. The system according to claim 18, further comprising:
a timer maintained by said operator, wherein said timer runs for a predetermined period of time before allowing at least stoppage of the barrier.

22. The system according to claim 21, wherein said operator allows at least stoppage and bi-directional movement of the barrier only after said predetermined period of time has elapsed.

23. The system according to claim 18, wherein said operator at least allows stoppage of the barrier only after the barrier travels a predetermined distance after generation of said obstruction signal.

24. The system according to claim 23, wherein said operator allows at least stoppage and bi-directional movement of the barrier only after a predetermined period of time has elapsed.

25. The system according to claim 18, further comprising:
a timer maintained by said operator, wherein said timer runs for a predetermined period of time after detecting an obstruction, wherein said operator moves the barrier upwardly upon either elapsing of said timer or detection of said command signal during said predetermined period of time.

26. The system according to claim 25, wherein said operator determines
whether the barrier is at a full-open limit position and stops the barrier if at the full-open limit position; and
wherein said operator monitors for the generation of said obstruction signal, and if detected, stops movement of the barrier.

27. The system according to claim 26, wherein said operator monitors for said command signals during movement toward said full-open limit position until said limit position is reached.

28. The system according to claim 26, wherein said operator monitors for said command signals and if detected, said operator determines whether the barrier has completed an initial upward barrier movement after generation of said obstruction signal.

29. The system according to claim 28, wherein said operator stops movement of the barrier if the barrier has completed said initial upward movement after receipt of said obstruction signal.

30. The system according to claim 28, wherein said operator continues upward movement of the barrier as long as the barrier has not completed said initial upward barrier movement resulting from an obstruction detection and no command signal is received.

31. The system according to claim 18, wherein said operator re-sets said obstruction fault flag to inactive after the barrier is moved a predetermined distance.

32. The system according to claim 31, wherein said operator re-sets said door stop process as inactive if said door stop delay timer has elapsed, said last move flag is in an up condition, and a full-open limit position is reached.

33. The system according to claim 31, wherein said operator re-sets said door stop process as inactive, and a next move flag to up, if said door stop delay timer has elapsed, a full-open limit position has not been reached and said obstruction fault flag is set to active by said obstruction signal.

34. The system according to claim 31, wherein said operator resets said door process as inactive if said door stop delay timer has elapsed, a full-open limit has not been reached and said obstruction fault flag is inactive.

* * * * *